(12) United States Patent
Davis

(10) Patent No.: US 6,450,455 B1
(45) Date of Patent: Sep. 17, 2002

(54) METHOD AND SENSOR FOR CAPTURING RATE AND POSITION AND STABILIZATION OF A SATELLITE USING AT LEAST ONE FOCAL PLANE

(75) Inventor: John E. Davis, Claremont, CA (US)

(73) Assignee: The Boeing Company, Seattle, WA (US)

( * ) Notice: Subject to any disclaimer, the term of this patent is extended or adjusted under 35 U.S.C. 154(b) by 16 days.

(21) Appl. No.: 09/756,395

(22) Filed: Jan. 8, 2001

(51) Int. Cl.[7] .................................................. B64G 1/36
(52) U.S. Cl. ...................................................... 244/171
(58) Field of Search ....................... 359/419; 244/158 R, 244/171, 169; 250/203.1, 202, 203.6

(56) References Cited

U.S. PATENT DOCUMENTS

| | | | |
|---|---|---|---|
| 3,781,552 A | * 12/1973 | Kadrmas | ............. 250/214 DC |
| 4,062,509 A | 12/1977 | Muhlfelder et al. | |
| 4,489,383 A | 12/1984 | Schmidt, Jr. | |
| 5,049,740 A | * 9/1991 | Pines et al. | ................. 244/3.16 |
| 5,161,051 A | 11/1992 | Whitney et al. | |
| 5,308,024 A | 5/1994 | Stetson, Jr. | |
| 5,319,696 A | 6/1994 | Billing-Ross et al. | |
| 5,319,968 A | 6/1994 | Billing-Ross et al. | |
| 5,381,264 A | * 1/1995 | Wickholm et al. | ........... 250/234 |
| 5,474,197 A | * 12/1995 | Hillis et al. | ................... 220/1.5 |
| 5,478,151 A | * 12/1995 | Duhrkoop | ............... 246/169 A |
| 5,502,309 A | 3/1996 | Davis | |
| 5,534,697 A | 7/1996 | Creekmore et al. | |
| 5,627,675 A | 5/1997 | Davis et al. | |
| 5,721,431 A | 2/1998 | Hersom et al. | |
| 5,726,814 A | * 3/1998 | Lidwell | ...................... 359/421 |
| 5,837,894 A | 11/1998 | Fritz et al. | |
| 5,841,589 A | 11/1998 | Davis et al. | |
| 6,026,337 A | 2/2000 | Krigbaum et al. | |
| 6,060,720 A | * 5/2000 | Simpson | ................... 250/203.6 |
| 6,066,850 A | 5/2000 | Hersom et al. | |

* cited by examiner

Primary Examiner—Charles T. Jordan
Assistant Examiner—Kevin Jakel
(74) Attorney, Agent, or Firm—Alston & Bird LLP (57) ABSTRACT

An optical sensor includes dual fields of view including a panoramic field of view spanning 360° in azimuth angle in a direction perpendicular to an axis of the sensor, and a limb-looking field of view non-perpendicular to the axis for viewing the limb of the earth. Both fields of view are imaged onto annular regions of one of more focal plane arrays comprising pixels arranged in a rectangular array of rows and columns. The sensor is used in a method for capturing rate and direction of rotation of a satellite about its axes and for detecting orientation of the satellite about two of its axes. Rate and direction are determined by finding the center of the earth relative to axes of the focal plane array based on the image of the earth limb from the panoramic field of view, and comparing the earth center location at a series of sequential times. The rate and position information are used for stabilizing an initially tumbling satellite after tip-off. Once the satellite is stabilized, its orientation is detected by finding the earth center location on the focal plane array based on the earth limb image from the limb-looking optics of the sensor. In one embodiment of the invention, both fields of view are imaged onto concentric inner and outer ring-shaped regions of the same focal plane array.

31 Claims, 5 Drawing Sheets

SENSOR 360-DEGREE COVERAGE FROM SATELLITE

METHOD AND SENSOR FOR CAPTURING RATE AND POSITION AND STABILIZATION OF A SATELLITE USING AT LEAST ONE FOCAL PLANE

FIELD OF THE INVENTION

The present invention relates to an optical sensor for viewing earth from an orbit thereabout and determining positional information of the sensor relative to earth by observing the limb of the earth. The invention further relates to a method for determining the rate and direction of rotation of an initially tumbling satellite about all three axes of the satellite, for eliminating the tumbling motion and stabilizing the satellite in a desired orientation, and for sensing the orientation of the stabilized satellite about two of the three axes, all using a single optical sensor.

BACKGROUND OF THE INVENTION

Optical sensors for satellites have been developed for viewing earth in order to derive position information of the satellite relative to earth. In such schemes, it is known to direct light from a field of view of the sensor onto a focal plane array, such as a charge coupled device (CCD), comprising a grid of pixels. The field of view and the optics of the sensor are typically designed such that at least part, and more typically all, of the circumference of the earth's limb (i.e., the transition region between the earth and space) can be imaged onto the focal plane when the sensor is pointed in a suitable direction relative to the earth. The relative location of the image of the earth limb on the focal plane is determined by finding the pixels at which a large gradient in intensity of the incident light energy, indicating a transition between earth and space, is located. Using an appropriate algorithm, it is possible to determine the rotational orientation of the sensor, and hence of the satellite, about two orthogonal axes based on the locations of the transition pixels of the focal plane array. See, for example, U.S. Pat. No. 6,026,337.

A number of patents for various types of optical sensors have been acquired by the assignee of the present application, including U.S. Pat. Nos. 5,502,309, 5,534,697, 5,627,675, and 5,841,589, the entire disclosures of which are hereby incorporated herein by reference. The sensors described in all of the aforementioned patents have a single field of view for looking at the limb of the earth. On satellites using a limb-looking optical sensor as described above, the optical sensor is generally used for deriving position information about two axes after the satellite has been stabilized following tip-off from the launch vehicle. An entirely different system is used for bringing the initially tumbling satellite into a controlled condition and stabilizing the satellite in that condition. Typically, inertial measurement units (IMUs), i.e., gyroscopes, are used for detecting the rotation rate of the tumbling satellite about all three axes, and this rate information is used by the satellite's control system to stop the tumbling motion. Once the satellite is no longer tumbling, it is then manipulated to place it in the desired orientation. Still other sensors are typically used to aid in this process, since it is possible for the satellite to be brought to a stabilized condition in an orientation in which the limb-looking sensor is looking away from earth so that the earth is not in its field of view. For instance, a sun sensor and/or sensors for viewing stars or other celestial bodies may be used to aid in maneuvering the satellite toward the desired orientation, at least until the earth comes into the field of view of the limb-looking sensor. It is apparent that this approach requires a considerable number of sensing devices.

SUMMARY OF THE INVENTION

The present invention provides an optical sensor and a method for determining the rate and direction of rotation of an initially tumbling satellite about all three axes of the satellite, for eliminating the tumbling motion and stabilizing the satellite in a desired orientation, and for sensing the orientation of the stabilized satellite about two of the three axes, all using a single optical sensor. The invention thus allows the usually required IMUs and sun or star sensors to be eliminated, thereby providing substantial savings in weight, cost, and complexity.

To these ends, an optical sensor in accordance with a preferred embodiment of the invention comprises at least one focal plane array comprising a plurality of pixels arranged in a grid, and both panoramic optics and limb-looking optics each of which maps its field of view onto a separate region of the at least one focal plane array. The panoramic optics capture radiant energy from an annular panoramic field of view spanning 360° in azimuth angle about an optical axis of the sensor and covering a range of elevation angles including 90° in elevation angle relative to the optical axis. The panoramic optics re-direct and focus the radiant energy from the panoramic field of view onto a first annular region of the at least one focal plane. The limb-looking optics capture radiant energy from an annular field of view spanning 360° in azimuth angle about the optical axis and covering a range of elevation angles non-perpendicular to the optical axis such that at least a major circumferential portion of a limb of the earth is within the field of view of the limb-looking optics when the optical axis of the sensor points toward a centroid of the earth. The limb-looking optics re-direct and focus the radiant energy onto a second annular region of the at least one focal plane.

A particularly simple sensor construction is made possible by directing the radiant energy from both fields of view onto the same focal plane array. Preferably, the panoramic field of view that looks generally perpendicular to the optical axis is imaged onto an inner ring-shaped region of the focal plane array, and the field of view that looks non-perpendicular to the optical axis is imaged onto an outer ring-shaped region radially outward of the inner ring-shaped region. Alternatively, where redundancy is desired for enhanced reliability, either or both of the fields of view can be optically split and imaged onto more than one focal plane array. Redundant electronics can be provided for the various focal plane arrays if desired.

Various optical arrangements for the sensor can be used. In one embodiment, the panoramic optics include a convex mirror of generally annular form that re-directs the radiant energy from the panoramic field of view along a direction generally parallel to the optical axis and away from the focal plane array, and a concave mirror that receives the radiant energy from the convex mirror and re-directs the radiant energy back generally toward the focal plane array. A curved meniscus lens receives the radiant energy from the concave mirror at a central portion of the meniscus lens, and a final lens receives the radiant energy from the central portion of the meniscus lens and focuses the radiant energy on the first annular region of the focal plane array. The limb-looking optics re-direct the radiant energy from the field of view of the limb-looking optics onto an outer portion of the curved meniscus lens lying radially outward of the central portion thereof, and the outer portion of the meniscus lens serves as a final optic for focusing the radiant energy onto the second annular region of the focal plane array. Preferably, the limb-looking optics comprise a plurality of lenses.

In another embodiment of the sensor, the convex mirror re-directs radiant energy from the panoramic field of view generally inwardly and toward the focal plane array, and the panoramic optics include a first lens having a central portion that receives radiant energy from the convex mirror, and a second lens that receives radiant energy from the central portion of the first lens and focuses the radiant energy onto the first annular region of the focal plane array. This embodiment thus eliminates the concave mirror of the previously described embodiment.

In still another embodiment of the sensor, the panoramic optics include a convex mirror that re-directs radiant energy from the panoramic field of view generally inwardly and toward the focal plane array, a pair of lenses in series that receive radiant energy from the convex mirror, and a curved meniscus lens having a central portion that receives radiant energy from the pair of lenses and focuses the radiant energy onto the first annular region of the focal plane array. The limb-looking optics comprise lenses for directing radiant energy from the field of view of the limb-looking optics onto an outer portion of the curved meniscus lens, the outer portion of the curved meniscus lens serving as a final lens for focusing the radiant energy onto the second annular region of the focal plane array. The pair of lenses preferably comprise two meniscus lenses with a concave surface of one of the meniscus lenses facing a concave surface of the other meniscus lens.

The invention also provides a method for determining the direction and rate of rotation of a satellite about first, second, and third mutually orthogonal body axes fixed relative to the satellite and for determining orientation of the satellite relative to earth. In accordance with this aspect of the invention, a dual field-of-view optical sensor is mounted on the satellite with an optical axis of the sensor in a predetermined orientation with respect to the body axes of the satellite. Radiant energy is directed onto a first annular region of a focal plane array from a first field of view of the sensor spanning 360° in azimuth angle about the optical axis and a range of elevation angles including 90° in elevation angle relative to the optical axis. Radiant energy is directed onto a second annular region of the same or a different focal plane array from a second field of view of the sensor spanning 360° in azimuth angle about the optical axis and a range of elevation angles non-perpendicular to the optical axis. Direction and rate of rotation of the satellite about the body axes are determined based on changes in the relative location of the earth limb subtense on the first annular region of the focal plane array over time. The sensor electronics periodically take readings from the focal plane array(s), and the location of the earth limb on the focal plane array(s) is compared at successive times to derive the direction and rate information. Orientation angles between the body axes of the satellite and a nadir vector to the earth are determined based on the relative location of the earth limb subtense on the second annular region of the focal plane array(s). In the general case, the earth limb location on the second annular region of the focal plane array can be used for deriving rotational orientation about two axes. The rotational orientation of the satellite about the third body axis can be determined by directional radio reception (e.g., from sister satellites in a constellation), by directional magnetic fields, or by directional inertial rotation.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
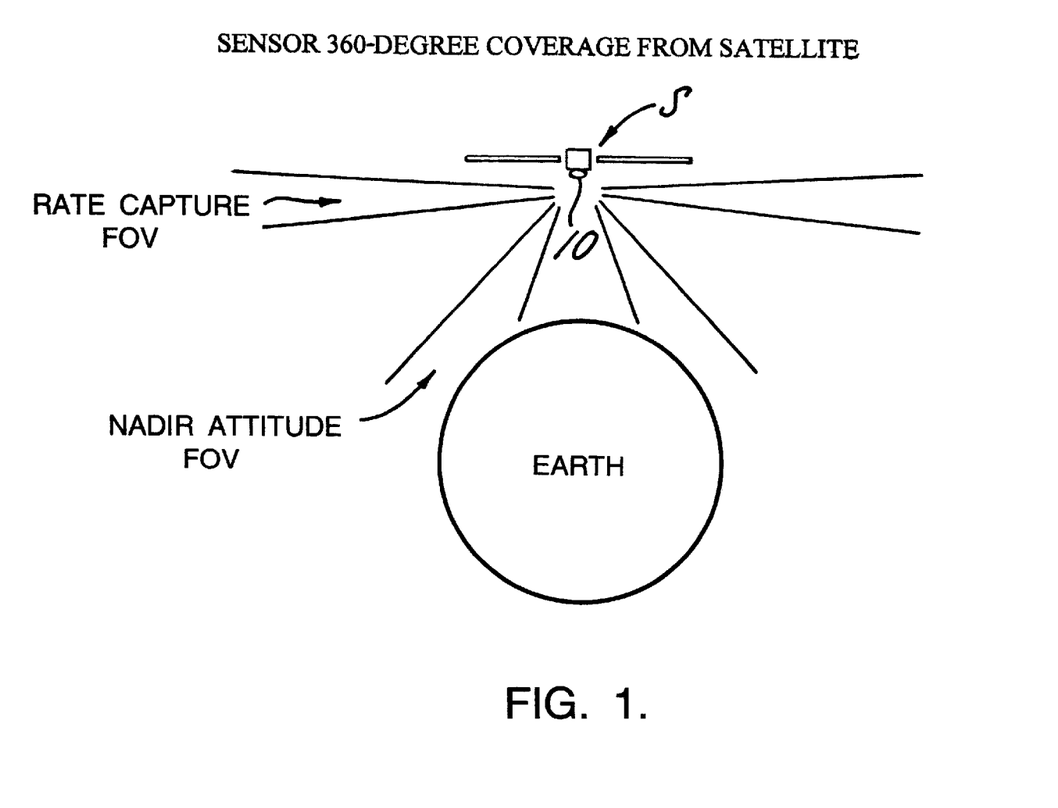
FIG. 1 is a diagrammatic view depicting a satellite in orbit about earth and having an optical sensor for viewing the earth in accordance with the present invention.

FIG. 1 diagrammatically depicts a satellite S in orbit about the earth. A sensor 10 in accordance with the present invention is mounted on the satellite. The sensor is mounted such that when the satellite is stabilized in a desired orientation relative to earth, the sensor points in a direction enabling it to see the earth. The sensor 10 is unique in that it has two fields of view that both span 360° in azimuth angle about the optical axis of the sensor. Thus, a first field of view is a panoramic view that looks essentially perpendicular to the optical axis of the sensor (in FIG. 1, the optical axis points at the centroid of the earth) and covers a range of elevation angles about the perpendicular direction. For example, the elevation angles relative to the optical axis can cover a range of about 90∀3°. As explained further below, the panoramic field of view is used for capturing the rate and direction of rotational motion of the satellite about its axes.

A second field of view of the sensor looks non-perpendicular to the optical axis of the sensor for seeing the horizon or limb of the earth. As an example, the second field of view can span elevation angles relative to the optical axis of about 28∀8°. As described below, the second field of view is used once the satellite has been stabilized and oriented generally in its desired attitude, for detecting orientation of the satellite relative to the nadir vector to the centroid of the earth.

As explained in further detail below, the radiant energy from the two fields of view of the sensor 10 are imaged, using suitable optics, onto annular regions of one or more focal plane arrays. Each focal plane array comprises a plurality of pixels each of which is sensitive to radiant energy striking the pixel so as to emit an electrical signal as a function of the intensity of the radiant energy. The pixels are arranged in a rectangular or square grid that preferably defines a planar surface for receiving the incident radiant energy. The focal plane array(s) can be sensitive to a single wavelength of light while being substantially insensitive to light of other wavelengths, or the focal plane array(s) can be multispectral such that a plurality of different wavelengths are detected. The focal plane array can be cooled in any suitable manner, if cooling is required.

Figure 2:
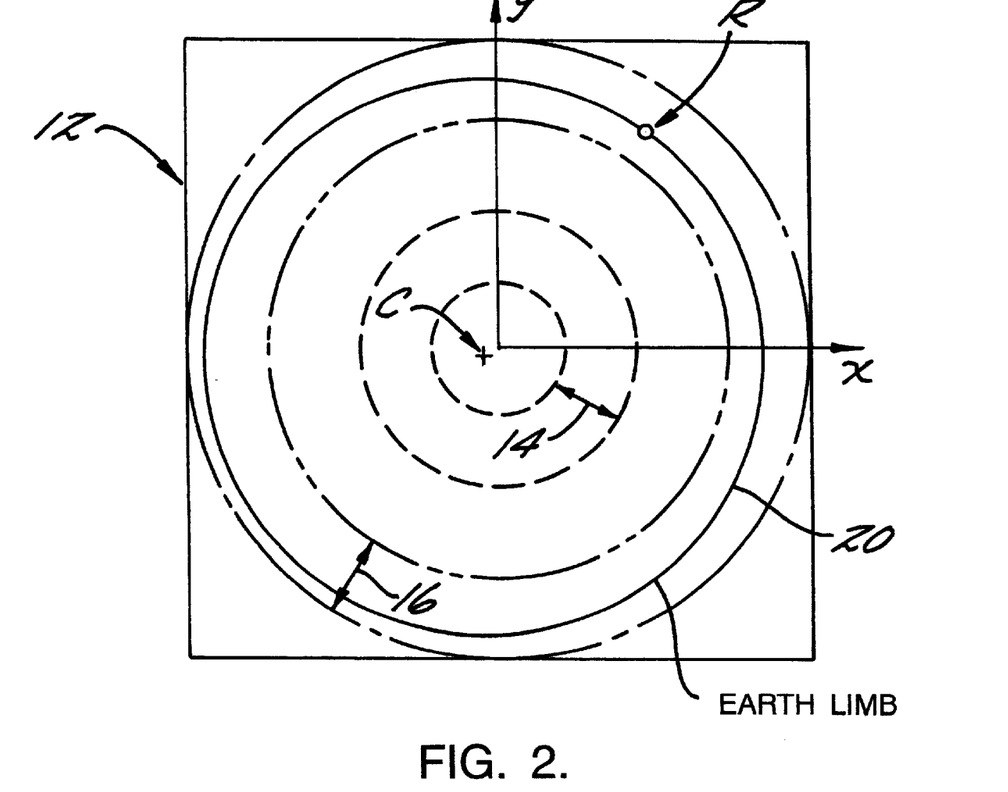
FIG. 2 is a schematic view of a focal plane array of the sensor, illustrating two annular regions onto which the two fields of view of the sensor are imaged.
Figure 3:
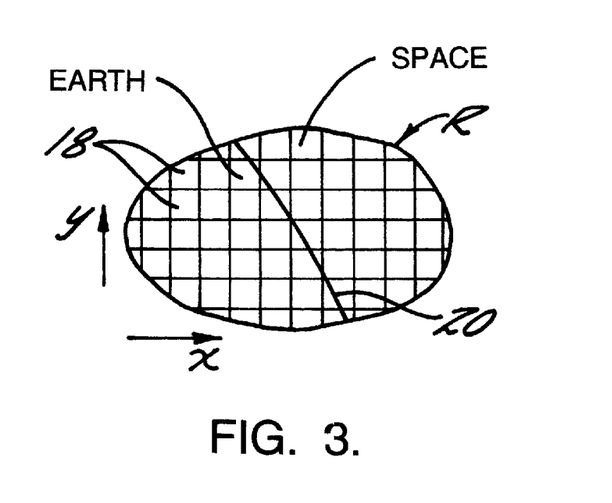
FIG. 3 is a greatly enlarged view of a small region of the focal plane array, showing a subtense of the earth limb imaged onto the region.

FIGS. 2 and 3 schematically depict a focal plane array 12 in accordance with a preferred embodiment of the invention. As shown in FIG. 2, the focal plane array 12 defines an inner annular region 14 and an outer annular region 16 that lies radially outward of and is concentric with the inner annular region 14. In accordance with the invention, radiant energy from the panoramic field of view of the sensor 10 is imaged onto the inner annular region 14. Radiant energy from the other field of view of the sensor is imaged onto the outer annular region 16 of the focal plane array. The center of both regions 14 and 16 is represented by an origin of orthogonal x and y axes in FIG. 2.

As shown in FIG. 3, which represents a small region of the surface of the focal plane array 12, the focal plane array has pixels 18 arranged in rows and columns. Each row extends parallel to the x-axis and each column extends parallel to the y-axis. The sensor generally will be mounted on the satellite in a fixed and known orientation relative thereto, and hence the x- and - and y-axes of the focal plane array 12 will be in a fixed and known orientation relative to defined body axes of the satellite. Accordingly, the location of an image of earth on the focal plane array 12 can be geometrically related to the orientation of the satellite's body axes relative to earth.

More particularly, FIG. 2 shows an image of the limb 20 of the earth on the outer annular region 16 of the focal plane array, and FIG. 3 represents a region R at which the limb is located. For a given row of pixels 18, there will be at most two crossings of the earth limb. Each crossing is characterized by a change in incident energy intensity from a relatively higher intensity emitted by the earth to a relatively lower intensity emitted by space. The width of the earth limb on a given row of pixels can be found by finding the two transition pixels at the opposite edges of the limb at which the transition from high to low, or low to high, intensity occurs. The locations of these transition pixels are saved in memory for each row, in terms of values of the x coordinate at the known y coordinate to which the row corresponds. A similar process is undertaken for each column of pixels in order to find and save the transition y coordinates for each column. By averaging the transition x values for all rows and averaging the transition y values for all columns, a single value of x and a single value of y are obtained corresponding to the coordinates of the center C of the earth. The offset between the center of the earth and the center of the focal plane array is related to the orientation of the sensor relative to earth, and thus can be used as a parameter for guiding the satellite into a desired orientation in two axes.

Even if the center of the earth is not within the view of the sensor such that there is only one crossing of the earth limb for some rows and/or columns, suitable algorithms can be used for determining the location of the earth center. For example, with a knowledge of the locations of the earth limb on a plurality of adjacent rows or columns, the shape of the arc of the earth limb can be determined and an orthogonal to the arc can be struck. By striking orthogonals to the arc from two different directions, the intersection of the two orthogonals can be found, which represents the earth center. If desired, orthogonals can be struck from more than two directions, and variation in the location of the earth center calculated from various pairs of orthogonals can give an indication of the level of confidence in the solution as well as the uncertainty in the calculation.

If desired, the accuracy of the determination of the earth limb location on the focal plane array can be improved by taking into consideration not just a single pixel representing the transition location, but instead also including data from the eight pixels immediately surrounding the pixel of interest. Thus, data from a total of nine pixels would be used for deriving a location of the limb crossing. Oversampling and digitizing of the pixel intensity data can be used to interpolate and thereby find the limb location to within about one-tenth of a pixel dimension.

Based on the foregoing, it will be recognized that a method has been disclosed for obtaining orientation of a satellite about two of its three axes. One of these two axes is tangential to the orbit of the satellite and the other is perpendicular to the first axis and to the nadir vector that points toward the earth centroid. For example, the sensor 10 can be mounted relative to the satellite such that the earth limb image on the focal plane array can be used for sensing rotational positions of the satellite about its pitch and roll axes. In this case, the sensor cannot provide orientation about the third or yaw axis because the circular limb of the earth appears the same regardless of the rotation about the yaw axis.

To get the orientation of the satellite about the third axis, various methods can be used. One method is to use a sensor to view another celestial body such as the sun, moon, or stars. Sun sensors are relatively low in cost but do not provide a high degree of accuracy. Star sensors are relatively more expensive and require a star catalog for precise pointing and tracking. Another method for getting the third axis orientation is to use directional radio reception of signals from other satellites in orbit about the earth. For instance, the satellite on which the sensor 10 is mounted may be one of a constellation of satellites in the same orbit, each transmitting radio-frequency signals, such as global positioning system (GPS) satellites in circular orbit. The satellite's position about the yaw axis can be steered based on the radio signal from one or more such other satellites. Other methods that can be used for getting the third axis orientation include using directional magnetic field detection, and using directional inertial rotation (e.g., gyroscopes).

Thus far, a method has been described for guiding a satellite in order to maintain it in a desired orientation relative to the earth. Although the view of earth imaged onto the outer annular region 16 of the focal plane array 12 need not be such that the earth center lies on the focal plane array, in general it is contemplated that the sensor would be directed in such a manner that the optical axis of the sensor would point toward the center of the earth, i.e., along the nadir vector, when the satellite is in its desired orientation. Thus, the outer annular region 16 would be used primarily for maintaining the satellite in a stabilized orientation wherein the center of the earth would be essentially centered on the focal plane array. However, it will be appreciated that when the satellite is initially deployed from a launch vehicle, it will generally be tumbling with rotation components about all three axes. The problem then becomes how to bring the satellite under control and maneuver it into the desired orientation.

To facilitate this process, the sensor 10 in accordance with the invention includes the second field of view comprising a 360° panoramic view perpendicular to the axis A of the sensor. This panoramic field of view is imaged onto the inner annular region 14 of the focal plane array. The location of the earth center relative to the axes of the focal plane array at a given instant in time is determined based on the instantaneous image of the earth limb on the inner annular region 14 in a manner similar to that described above. In particular, it is preferable to strike orthogonals to the arc of the earth limb from two or more different directions and find the earth center based on the intersection of the orthogonals, since in the general case only a fraction of the earth may be within the panoramic field of view.

In order to determine the direction and rate of rotation of the satellite about its axes, the location of the center of the earth imaged onto the inner annular region of the focal plane array relative to the axes of the focal plane array is tracked over a series of sequential times. Knowing where the edge of the earth limb is moving relative to the focal plane axes enables the direction of rotation of the satellite about each axis to be determined; knowing the rate of movement of the earth limb enables the rate of rotation about each axis to be determined. The direction and rate information can be used by the satellite's guidance and navigation system to reduce the tumbling of the satellite and bring the satellite into a controlled orientation, which generally will be an orientation in which the limb-looking field of view of the sensor would have the earth limb in view such that the sensor can be used for continuing guidance of the satellite to maintain the desired orientation as previously described.

More particularly, with respect to the process of stopping the tumbling of the satellite using the rate capture portion of the sensor, the direction of the earth in roll from the satellite is determined from the concave or convex curvature of the earth limb imaged onto the inner ring 14 of the focal plane array. The direction of the earth in yaw or pitch from the satellite is determined from the changes in the limb between sequential frames from the focal plane array. For example, an increasing view of the limb indicates that the satellite is tumbling in the axis in which the highest part of the earth limb is showing. The stabilizing jets on the satellite are activated to slow that motion. If the image is rotating such that the curve of the limb is growing on one side and retreating on the other side of the ring 14, that indicates that the satellite is tumbling on the axis of the satellite pointing toward the limb. The jets are activated to slow that motion.

The first task of the satellite control system is to remove the rate of rotation in all three axes. Once that is accomplished, the control system then uses the jets to slowly move the satellite until the optical axis of the sensor points at the center of the earth. This is accomplished by detecting the bend of the earth limb on the inner ring 14 of the sensor and commanding the satellite to turn the image away from the limb. This will bring the image into the outer ring 16 of the sensor's focal plane array. When the earth limb starts showing on the outer ring 16, the jets are commanded to slow the rotation; during this process, the rates of rotation are determined by the motion of the limb on the outer ring 16. It should be noted that the rate of the indicated motion is different between the inner and outer rings, and the attitude control electronics must account for this rate difference.

Figure 4:
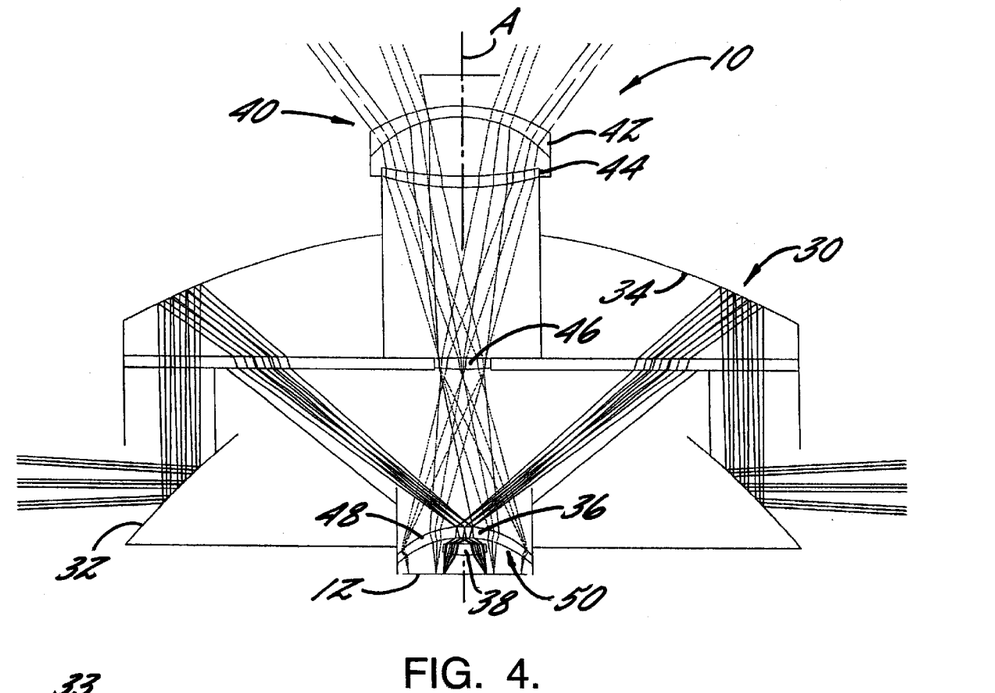
FIG. 4 is an optical schematic of a sensor in accordance with a first embodiment of the invention.

Having described the method of determining direction, rate, and orientation of the satellite using a single optical sensor, attention is now turned to a description of several preferred embodiments of sensors in accordance with the invention. FIG. 4 depicts an optical schematic of a first preferred embodiment of a sensor 10. The sensor 10 has a set of panoramic optics 30 for capturing radiant energy from a 360° panoramic field of view looking perpendicularly outward from the optical axis A of the sensor and spanning a range of elevation angles as indicated by the ray traces showing the elevation angle limits. The sensor also has a set of limb-looking optics 40 for capturing radiant energy from a 360° field of view about the optical axis A looking outward in a direction non-perpendicular to the axis A. Both sets of optics include elements for re-directing and focusing the captured radiant energy onto a focal plane array 12 mounted in the sensor.

More particularly, the panoramic optics 30 include a 360° convex mirror 32 that re-directs the radiant energy from the panoramic field of view in a direction parallel to the optical axis A and away from the focal plane array 12. The re-directed radiant energy from the convex mirror 32 is then re-directed by a 360° concave mirror 34 in a radially inward direction toward the focal plane array 12. The mirrors 32 and 34 preferably comprise a Mersenne optic pair. The energy from the mirror pair 32, 34 passes through a strongly curved meniscus lens 50. More specifically, the energy from the mirror pair passes through a central portion 36 of the meniscus lens 50, which central portion functions as a part of the panoramic optics 30. A final component of the panoramic optics is a plano-convex lens 38 that receives the energy from the central portion 36 of the meniscus lens and focuses the energy onto an inner annular region of the surface of the focal plane array 12. Of course, it will be understood that any or all of the various lenses in the panoramic optics could be replaced by suitably configured reflective surfaces.

The limb-looking optics 40 include a pair of back-to-back concave-convex lenses 42 and 44, followed by an intermediate bi-convex lens 46, which transmit radiant energy from the non-perpendicular field of view to an outer annular portion 48 of the meniscus lens 50 that surrounds the central portion 36. The outer portion 48 of the meniscus lens serves as a final lens that focuses the energy onto an outer annular region of the focal plane array 12. The lenses 42, 44, 46 could be replaced in whole or in part by a plurality of reflective surfaces of suitable design.

Figure 5:
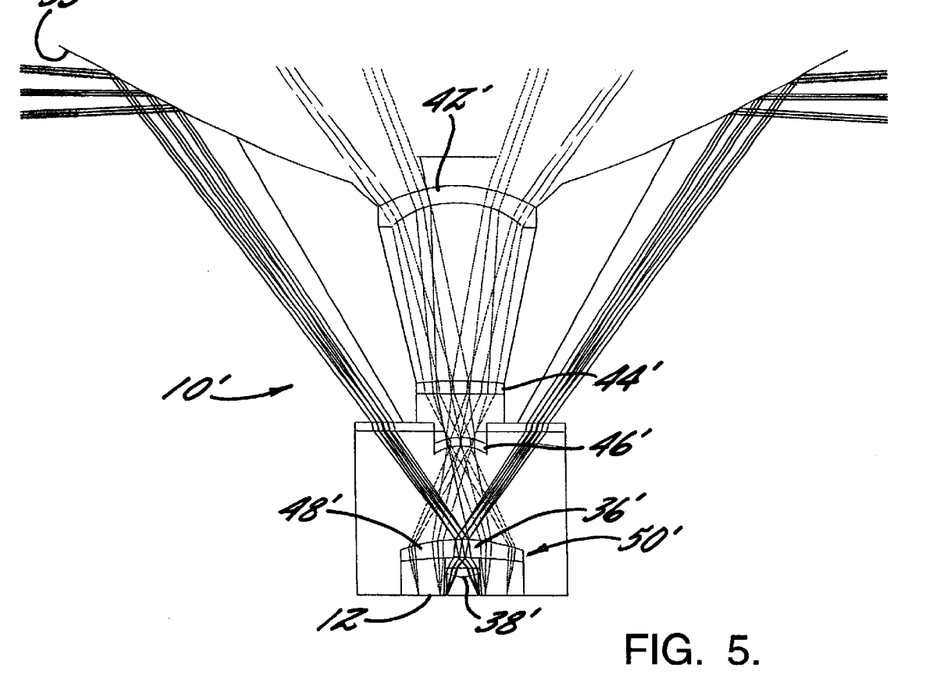
FIG. 5 is an optical schematic of a sensor in accordance with a second embodiment of the invention.

FIG. 5 depicts a second embodiment of a sensor 10' in accordance with the invention. In contrast to the sensor 10 of FIG. 4 in which a Mersenne pair is used for bending the radiant energy from the panoramic scene toward the focal plane array, the panoramic optics of the sensor 10' employ a single hyperbolic convex mirror 33 for this purpose. The energy from the mirror 33 passes through a central portion 36' of a nearly plano-convex lens 50', and then through a final conic lens 38' that focuses the energy on the inner annular region of the focal plane array 12. The limb-looking optics of the sensor 10' comprise three lenses 42', 44', 46' in series, followed by the nearly plano-convex lens 50' whose outer portion 48' serves as a final lens focusing the energy on the outer annular region of the focal plane array 12.

Figure 6:
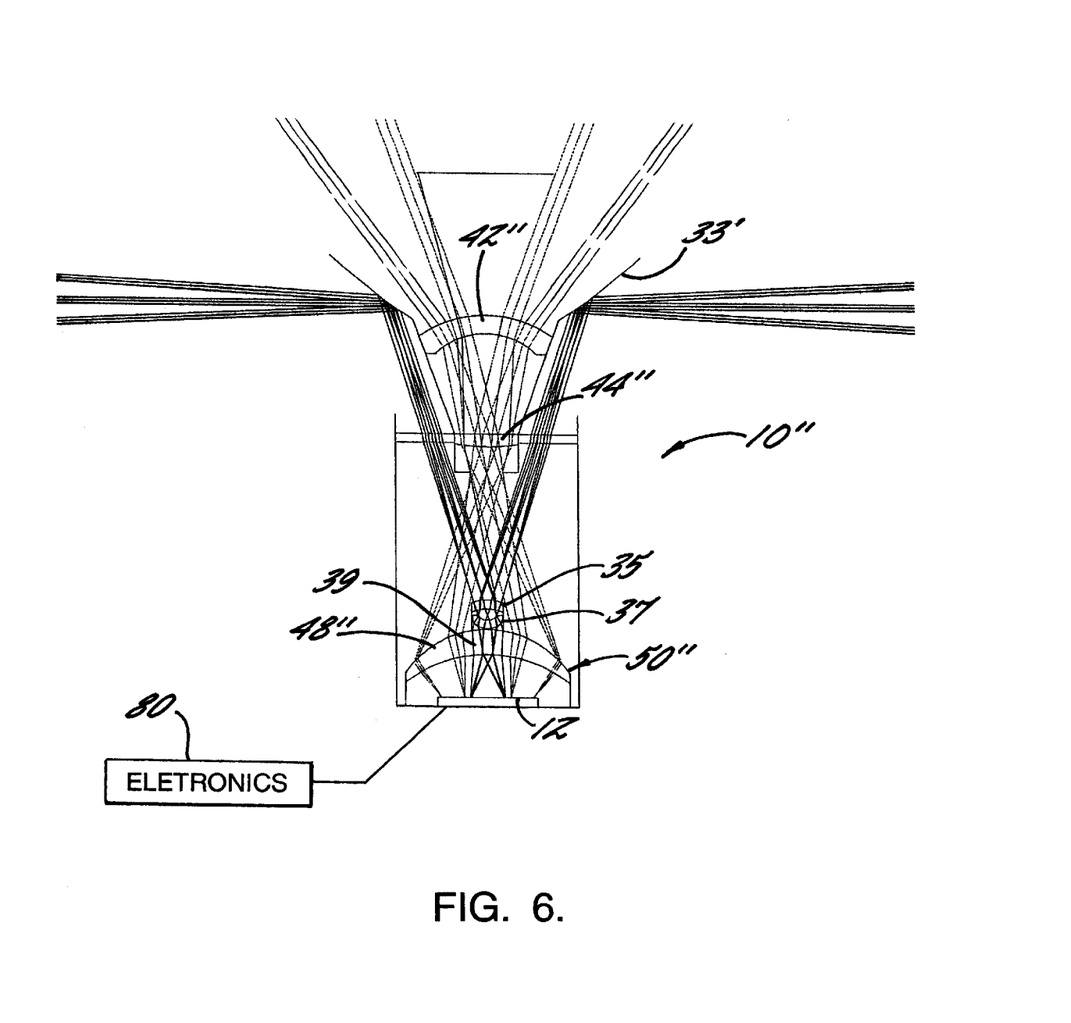
FIG. 6 is an optical schematic of a sensor in accordance with a third embodiment of the invention.

FIG. 6 shows a third embodiment of a sensor 10" in accordance with the invention. The panoramic optics of the sensor 10" include a single convex mirror 33' for bending the radiant energy from the panoramic scene toward the focal plane array 12. The sensor 10" differs from the previous two embodiments in that the final optic for the panoramic optics is not located between the focal plane and the final focusing element for the limb-looking optics as is the case with the previous embodiments. Thus, the energy from the convex mirror 33' passes through a back-to-back pair of meniscus lenses 35 and 37 and finally through a central portion 39 of a strongly curved meniscus lens 50" that focuses the energy on the inner annular region of the focal plane array 12. A stop, not visible in FIG. 6, is located between the two meniscus lenses 35, 37. The first surface of the second meniscus lens 37 is conic. The limb-looking optics of the sensor 10" comprise only three lenses 42", 44", and the outer portion 48" of the lens 50".

In all of the described and illustrated sensor embodiments, the limb-looking optics are inverse telephoto types in which there is a negative power group followed by a positive power group. The inverse telephoto design is particularly suitable for wide fields of view. The meniscus lens near the focal plane serves to flatten the field and correct astigmatism.

It will be recognized by those skilled in the art that a negative lens could be used in place of the mirror or pair of mirrors of the panoramic optics for any of the sensors. The mirrors, however, have the advantage of producing substantially less pupil foreshortening than a negative lens; on the other hand, the mirrors tend to introduce astigmatism that must be corrected by the focusing lenses. From the foregoing, it should be apparent that the particular types and arrangements of optical elements chosen for accomplishing the objectives of the dual field-of-view sensor can be varied in many different ways, and all of these variations are intended to be encompassed by the present invention and the appended claims.

In the sensor in accordance with the invention, although a single focal plane array is shown, it is also possible to employ an optical splitter (not shown) for splitting radiant energy from either or both of the two fields of view and directing the radiant energy onto two or more focal plane arrays. This provides redundancy for enhanced reliability. Each focal plane array can have its own set of electronics. It is also possible to direct the radiant energy from the panoramic field of view onto one focal plane array and to direct the radiant energy from the limb-looking optics onto a different focal plane array. Thus, the invention as defined in the appended claims is not limited to the single focal plane arrangements illustrated and described herein.

The sensor and method of the present invention can be employed for satellites in various orbits including circular or elliptical orbits, from low altitude up to geosynchronous altitude.

Figure 7:
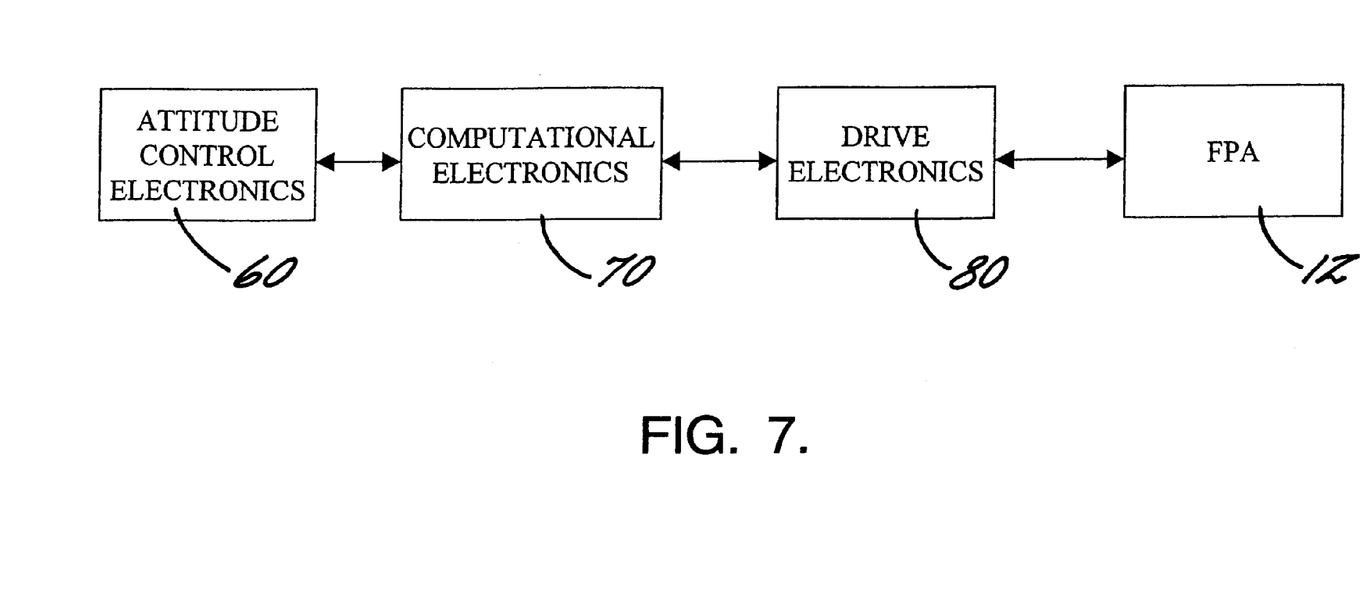
FIG. 7 is a diagrammatic depiction of an attitude control system in accordance with the invention.

FIG. 7 diagrammatically depicts an attitude control system in accordance with the invention. The system includes attitude control electronics 60 for controlling the stabilizing jets. Coupled with the attitude control electronics are computational electronics 70 for making the necessary calculations of rate and position based on the signals from each of the rings 14, 16 of the focal plane array (FPA) 12. The signals from the FPA 12 are communicated via drive electronics 80 to the computational electronics. The electronics connected to the sensor capture signals from the focal plane array by sampling the signals periodically to create a series of sequential frames. Advantageously, the electronics are operable to create at least about 10 frames per second, and preferably the location of the subtense of the earth limb on each of the annular regions is sampled at least three times for each frame. Below the 10 frame per second rate, it is anticipated that it would be difficult to maintain stabilization of the satellite in the desired orientation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for determining direction and rate of rotation of a satellite about first, second, and third mutually orthogonal body axes fixed relative to the satellite and for determining orientation of the satellite relative to earth, comprising:

mounting a dual field-of-view optical sensor on the satellite with an optical axis of the sensor in a predetermined orientation with respect to the body axes, the sensor having at least one focal plane array comprising a plurality of pixels arranged as a grid;

directing radiant energy from a first field of view of the sensor onto a first annular region of the at least one focal plane array, the first field of view spanning 360° in azimuth angle about the optical axis and a range of elevation angles including 90° in elevation angle relative to the optical axis;

directing radiant energy from a second field of view of the sensor onto a second annular region of the at least one focal plane array, the second field of view spanning 360° in azimuth angle about the optical axis and a range of elevation angles non-perpendicular to the optical axis;

determining a relative location of a subtense of a limb of the earth on the first annular region of the at least one focal plane array at each of a plurality of successive times, and determining direction and rate of rotation of the satellite about the body axes based on changes in the relative location of the earth limb subtense on the first annular region; and determining a relative location of the earth limb subtense on the second annular region of the at least one focal plane array, and determining orientation angles between the body axes and a nadir vector to the earth based on the relative location of the earth limb subtense on the second annular region.

2. The method of claim 1, further comprising:

substantially reducing tumbling of the satellite by applying corrective thrusts to the satellite based on the rates and direction of rotation determined from the first field of view of the sensor; and placing and stabilizing the satellite in a predetermined orientation relative to the nadir vector by applying stabilizing thrusts to the satellite based on the orientation angles determined from the second field of view of the sensor.

3. The method of claim 1, wherein the first and second fields of view are directed respectively onto concentric first and second annular regions of the same focal plane array.

4. The method of claim 3, wherein the first annular region comprises an inner ring and the second annular region comprises an outer ring lying radially outwardly of the inner ring.

5. The method of claim 4, wherein the pixels of the focal plane array are arranged in a plurality of parallel rows and a plurality of parallel columns perpendicular to the rows, the relative location of the earth limb subtense being determined on each of the inner and outer rings by detecting transition pixels in each row and each column at which a transition between earth and space falls.

6. The method of claim 1, wherein sensor electronics connected to the sensor capture signals from the at least one focal plane array by sampling the signals periodically to create a series of sequential frames, and wherein the location of the subtense of the earth limb on each of the annular regions is sampled at least three times for each frame.

7. The method of claim 1, further comprising directing radiant energy from at least one of the fields of view onto more than one focal plane array.

8. The method of claim 7, wherein a separate set of electronics is provided for each focal plane array to enable multiple signal paths for enhanced reliability.

9. The method of claim 1, wherein the at least one focal plane array is operable to detect radiant energy in a wavelength band chosen so as to provide both day and night limb contrast and such that limb height changes caused by season and diurnal changes are minimized.

10. The method of claim 9, wherein the wavelength band lies within a range from about 3.5 $\mu$m to about 4.5 $\mu$m.

11. The method of claim 1, wherein sensor electronics connected to the sensor capture signals from the at least one focal plane array by sampling the signals periodically at a defined sampling rate to create a series of sequential frames, and wherein the sampling rate is at least about 10 frames per second.

12. The method of claim 1, wherein rotational orientations of the satellite about two of the body axes are determined from the second annular region of the at least one focal plane array, and further comprising determining a rotational orientation of the satellite about the third body axis by directional radio reception.

13. The method of claim 1, wherein rotational orientations of the satellite about two of the body axes are determined from the second annular region of the at least one focal plane array, and further comprising determining a rotational orientation of the satellite about the third body axis by directional magnetic fields.

14. The method of claim 1, wherein rotational orientations of the satellite about two of the body axes are determined from the second annular region of the at least one focal plane array, and further comprising determining a rotational orientation of the satellite about the third body axis by directional inertial rotation.

15. A dual field-of-view optical sensor comprising:
at least one focal plane array comprising a plurality of pixels arranged in a grid;
panoramic optics for capturing radiant energy from an annular panoramic field of view spanning 360° in azimuth angle about an optical axis of the sensor and covering a range of elevation angles including 90° in elevation angle relative to the optical axis, the panoramic optics re-directing and focusing the radiant energy from the panoramic field of view onto a first annular region of the at least one focal plane array; and
limb-looking optics for capturing radiant energy from an annular field of view spanning 360° in azimuth angle about the optical axis and covering a range of elevation angles non-perpendicular to the optical axis such that at least a major circumferential portion of a limb of the earth is within the field of view of the limb-looking optics when the optical axis of the sensor points toward a centroid of the earth, the limb-looking optics re-directing and focusing the radiant energy onto a second annular region of the at least one focal plane array.

16. The sensor of claim 15, wherein the panoramic optics include a convex mirror of generally annular form.

17. The sensor of claim 16, wherein the convex mirror re-directs the radiant energy from the panoramic field of view along a direction generally parallel to the optical axis and away from the at least one focal plane array, and wherein the panoramic optics further includes a concave mirror that receives the radiant energy from the convex mirror and re-directs the radiant energy back generally toward the at least one focal plane array.

18. The sensor of claim 17, wherein the panoramic optics include a curved meniscus lens that receives the radiant energy from the concave mirror at a central portion of the meniscus lens, and a final lens that receives the radiant energy from the central portion of the meniscus lens and focuses the radiant energy on the first annular region of the at least one focal plane array.

19. The sensor of claim 18, wherein the first and second annular regions respectively comprise concentric inner and outer rings defined on the same focal plane array, the limb-looking optics re-directing the radiant energy from the field of view of the limb-looking optics onto an outer portion of the curved meniscus lens lying radially outward of the central portion thereof, and the outer portion of the meniscus lens serving as a final optic for focusing the radiant energy onto the second annular region of the focal plane array.

20. The sensor of claim 19, wherein the limb-looking optics comprise a plurality of lenses.

21. The sensor of claim 16, wherein the convex mirror re-directs radiant energy from the panoramic field of view generally inwardly and toward the at least one focal plane array, and wherein the panoramic optics further comprise lenses for focusing the radiant energy from the convex mirror onto the at least one focal plane array.

22. The sensor of claim 21, wherein the panoramic optics comprise a first lens having a central portion that receives radiant energy from the convex mirror, and a second lens that receives radiant energy from the central portion of the first lens and focuses the radiant energy onto the first annular region of the at least one focal plane array.

23. The sensor of claim 22, wherein an outer portion of the first lens receives radiant energy from the limb-looking optics and serves as a final lens that focuses the radiant energy from the field of view of the limb-looking optics onto the second annular region of the at least one focal plane array.

24. The sensor of claim 23, wherein the first and second annular regions are defined on the same focal plane array and respectively comprise inner and outer concentric rings.

25. The sensor of claim 23, wherein the limb-looking optics comprise a plurality of lenses.

26. The sensor of claim 16, wherein the panoramic optics further comprise a pair of lenses in series that receive radiant energy from the convex mirror, and a curved meniscus lens having a central portion that receives radiant energy from the pair of lenses and focuses the radiant energy onto the first annular region of the at least one focal plane array.

27. The sensor of claim 26, wherein the limb-looking optics comprise lenses for directing radiant energy from the field of view of the limb-looking optics onto an outer portion of the curved meniscus lens, the outer portion of the curved meniscus lens serving as a final lens for focusing the radiant energy onto the second annular region of the at least one focal plane array.

28. The sensor of claim 27, wherein the pair of lenses comprise two meniscus lenses with a concave surface of one of the meniscus lenses facing a concave surface of the other meniscus lens.

29. A method for determining direction and rate of rotation of a satellite about first, second, and third mutually orthogonal body axes fixed relative to the satellite, comprising:
mounting an optical sensor on the satellite with an optical axis of the sensor in a predetermined orientation with respect to the body axes, the sensor having at least one focal plane array comprising a plurality of pixels arranged as a grid;

directing radiant energy from a panoramic field of view of the sensor onto an annular region of the at least one focal plane array, the panoramic field of view spanning 360° in azimuth angle about the optical axis and a range of elevation angles including 90° in elevation angle relative to the optical axis; and determining a relative location of a subtense of a limb of the earth on the annular region of the at least one focal plane array at each of a plurality of successive times, and determining direction and rate of rotation of the satellite about the body axes based on changes in the relative location of the earth limb subtense on the annular region.

30. The method of claim 29, further comprising:

substantially reducing tumbling of the satellite by applying corrective thrusts to the satellite based on the rates and direction of rotation determined from the panoramic field of view of the sensor.

31. The method of claim 29, wherein the pixels of the focal plane array are arranged in a plurality of parallel rows and a plurality of parallel columns perpendicular to the rows, the relative location of the earth limb subtense being determined on the focal plane array by detecting transition pixels in each row and each column at which a transition between earth and space falls.

* * * * *

UNITED STATES PATENT AND TRADEMARK OFFICE
CERTIFICATE OF CORRECTION

PATENT NO.    : 6,450,455 B1
DATED         : September 17, 2002
INVENTOR(S)   : Davis It is certified that error appears in the above-identified patent and that said Letters Patent is hereby corrected as shown below:

<u>Title page,</u>
Item [56], References Cited, U.S. PATENT DOCUMENTS, "5,319,696" should read -- 5,319,969 --; and "6,060,720" should read -- 6,060,702 --.

Signed and Sealed this

Fourth Day of February, 2003

JAMES E. ROGAN
*Director of the United States Patent and Trademark Office*